United States Patent [19]
Tkatchenko

[11] 3,897,508
[45] July 29, 1975

[54] DIOLEFIN DIMERIZATION

[75] Inventor: Igor Tkatchenko, Pau, France

[73] Assignees: Union Chimique Elf-Aquitaine, Courbevoie; Institut Francais du Petrole, des Carburants et Lubrifiants, Rueil-Malmaison, both of France

[22] Filed: Oct. 10, 1973

[21] Appl. No.: 404,889

[30] Foreign Application Priority Data
Oct. 10, 1972  France .............................. 72.35765

[52] U.S. Cl......... 260/666 B; 260/666 PY; 252/438
[51] Int. Cl. ............................................. C07c 3/00
[58] Field of Search ................ 260/666 B, 666 PY; 252/438

[56] References Cited
UNITED STATES PATENTS

| | | | |
|---|---|---|---|
| 3,377,397 | 4/1968 | Maxfield | 260/666 B |
| 3,436,431 | 4/1969 | Candlin et al. | 260/666 B |
| 3,446,861 | 5/1969 | Menapace et al. | 260/666 B |
| 3,446,862 | 5/1969 | Menapace et al. | 260/666 B |
| 3,526,672 | 9/1970 | Boyer | 260/666 B |
| 3,542,887 | 11/1970 | Hillegass et al. | 260/666 B |
| 3,655,793 | 4/1972 | Myers | 260/666 B |
| 3,660,342 | 5/1972 | Duggan | 260/666 B |

*Primary Examiner*—Veronica O'Keefe
*Attorney, Agent, or Firm*—Ostrolenk Faber Gerb & Soffen

[57] ABSTRACT

A process for the dimerization or codimerization of diolefins in the liquid phase in an inert solvent solution using a catalyst comprising a complex obtained by reacting the alkali metal or alkaline earth metal salt of tricarbonyl nitrosyl ferrate anion with a metallic halogen or pseudohalogen or complex thereof is disclosed.

13 Claims, No Drawings

DIOLEFIN DIMERIZATION

BACKGROUND OF THE INVENTION

The manufacture of 4-vinyl cyclohexene (hereinafter called V$_4$CH) has been the object of substantial research for a long period of time. V$_4$CH is a material of prime interest because it can be easily dehydrogenated to produce styrene.

It has been known for some time that the specific dimerization of butadiene to V$_4$CH is possible by thermal means but this procedure requires a high temperature and the dimerization is slow. Additionally, a simultaneous polymerization occurs and competes with the desired Diels-Alder reaction.

Utilization of catalysts have been recommended to improve the speed of the butadiene dimerization. The catalytic systems comprising salts or complexes of nickel, iron or manganese with amine or phosphorus ligands and with reducing compounds, in particular organoaluminums, convert butadiene to a mixture of cyclo-1,5-octadiene, V$_4$CH and 1,5,9-cyclododecatriene in variable proportions according to operating conditions although the cyclo-1,5-octadiene is the predominant product. Thus, German Pat. No. 1,140,569 teaches that a nickel bis(acetylacetonate)-triphenyl phosphine — monoethoxydiethyl aluminum catalyst yields V$_4$CH with only a 21% selectivity.

Catalyst compositions giving V$_4$CH in a selective manner from butadiene are known. Such systems are constituted by such metals as iron, ruthenium and cobalt which include a nitrosyl ligand in association with a carbonyl ligand and/or $\pi$-allyl. Such systems are described in British Pat. Nos. 1,085,875 and 1,148,177 with iron dinitrosyl dicarbonyl, cobalt dinitrosyl dicarbonyl and $\pi$-allyl iron nitrosyl dicarbonyl being recommended. However, these catalytic systems present a number of disadvantages. Their preparation requires two reaction steps starting from the metal carbonyl and they have a major disadvantage of being very volatile and having a significantly high toxicity.

Further, when one uses these catalysts, the dimerization reaction requires temperatures of at least 100° C. which involves a rapid deactivation of the catalyst. Also, this catalyst can only be used after a more or less long period of induction which decreases the economic feasibility of the process.

French Pat. No. 1,502,141 describes a catalytic system which has the advantage of accomplishing the dimerization of butadiene at a temperature as low as room temperature. This system is constituted by a halide of iron dinitrosyl in association with a donor compound and a reducer. Butadiene is quantitatively transformed to V$_4$CH at temperatures below 30° C. This disadvantage of this catalytic system is that it requires the use of an expensive reducer compound such as allyl magnesium bromide thereby decreasing industrial interest in this catalytic procedure.

French Pat. No. 1,535,936 teaches a catalytic system using compounds such as dihalo-bis-($\pi$-allyl dinitrosyl iron) tin or germanium prepared in situ at temperatures of the order of 40° C. for dimerizing butadiene. This catalytic system also requires the use of organometallic compounds of tin or germanium which are expensive and most often toxic.

The present invention remedies the disadvantages of the prior art. Thus, the catalyst of the present invention presents the following simultaneous advantages: easy manipulation of non-toxic materials, ease in preparation, absence of expensive reducing agents in the system, and optimum activity obtained at controllable tempertures s between 40° – 60° C. The catalyst of the present invention also permits one to obtain V$_4$CH from butadiene at practically quantitative yields. These and other advantages of the present dimerization catalyst will be apparent to those of ordinary skill in the art from the following detailed description.

SUMMARY OF THE INVENTION

This invention relates to dimerization catalysts and a process of dimerization and more particularly to a process for the liquid phase dimerization or codimerization of diolefins with a catalyst comprising a complex obtained by reacting the alkali metal or alkaline earth metal salt of tricarbonyl nitrosyl ferrate anion with a metallic halogen, pseudo-halogen or complex thereof.

DESCRIPTION OF THE PREFERRED EMBODIMENTS

The liquid phase diolefin dimerization of the present invention is characterized by use of a catalyst which is constituted by the reaction product of an alkali metal salt or alkaline earth metal salt of tricarbonyl nitrosyl ferrate anion with a metallic halogen, pseudo-halogen or complex thereof, compound.

The alkali metal or alkaline earth metal salt of the tricarbonyl nitrosyl ferrate anion is of the formula $M^1[Fe(CO)_3NO]_m$ in which $M^1$ is an alkali metal when $m$ is 1 and is an alkaline earth metal when $m$ is 2. The compounds $M^1[Fe(CO)_3NO]_m$ are known materials and can be prepared by methods described in the literature, for example, in R. D. King, Organometallic Synthesis, 1,167–168 (1965). Examples of usable salts include sodium and potassium tricarbonyl nitrosyl ferrate and magnesium, calcium, strontium and barium bis(tricarbonyl nitrosyl ferrate).

The halogen or pseudo-halogen compound is of the formula $M^2X_n$ in which $M^2$ is an element of Groups I–A, II, III, IV, V, VI–B, VII–B or VIII of the Periodic Table appearing on pages 60–61 of Lange's Handbook of Chemistry (Revised 10th Edition). The metals of Groups II–A and VIII are particularly preferred. X is a mono- or divalent anion and is a halogen such as fluorine, chlorine, bromine and iodine or a pseudo-halogen such as cyanide, sulfocyanide, isocyanate, nitrate, nitrite, sulfate, acetylacetonate, carboxylate, and the like, and $n$ is an integer from 1–6. As examples of these halogen and pseudo-halogen compounds there can be listed: sodium chloride, magnesium chloride, calcium chloride, strontium chloride, barium chloride, aluminum chloride, aluminum bromide, silver nitrate, ferrous acetylacetonate, and ferric acetylacetonate.

The complexes of $M^2X_n$ are of the formula $L_pM^2X_n$ in which L is a chalcogen or pnicogen and $p$ is an integer of 1–6. Typical complexes include dichlorozinc bipyridine, dichlorotin bipyridine, dichloronickel bipyridine, dichloropalladium bipyridine, bis(pyridine) dichloronickel, bis-(pyridine) dichloropalladium, bis(triphenylphosphine) dichloronickel, bis(triphenylphosphine) dichloropalladium, bis[(diphenylphosphino) ethane] dichloronickel, bis[(diphenylphosphino) ethane] dichloropalladium, and the like. The complexes are prepared by mixing the compound $M^2X_n$ with the ligand L in an appropriate solvent, such as those described below.

The catyalyst of the present invention can be prepared by mixing a suspension or solution of the alkali metal or alkaline earth metal carbonyl nitrosyl ferrate in an appropriate solvent with a solution or suspension of $M^2X_n$ or $L_pM^2X_n$ in the same solvent. The mixture is heated from 30°-70° C. and agitated for a time sufficient for reaction to occur, which can conveniently be about 1 hour. The ratio between the alkali metal or alkaline earth metal ferrate and the $M^2X_n$ compound or one of its $L_pM^2X_n$ complexes can vary over a wide range of between 0.5 $n/m$ and 5 $n/m$. It is preferable, however, that this ratio be equal to $n/m$ which corresponds to the stoichiometry of the reaction.

The reaction which occurs to give the catalytic compound can be thought out as occurring according to the following reaction scheme:

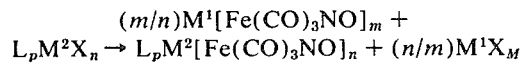

$$(m/n)M^1[Fe(CO)_3NO]_m + L_pM^2X_n \rightarrow L_pM^2[Fe(CO)_3NO]_n + (n/m)M^1X_M$$

One preferred embodiment of the invention involves preparing the catalyst in situ and utilizing the catalyst without isolating the $L_PM^2[Fe(CO)_3NO]_n$ from the reaction mixture.

In the dimerization process, a catalytic amount of the catalyst, which can vary within broad limits of up to about 10 m.Mole percent, is used. It has been found that a ratio of diolefin to catalyst in the order of 300, i.e., about 0.33 m.Mole percent, gives excellent results.

The dimerization of the instant invention is achieved by adding the liquid diolefin to the catalyst. The reaction is effected in a pressure vessel which is maintained under sufficient pressure to maintain the reaction mixture in the liquid phase. In general, a pressure of about 5 kg/cm², preferably about 3 kg/cm², can be used and the particular pressure varies according to the particular parameters used. The reaction temperature can vary between 20°-120° C. but is preferably between 40°-80° C. In the dimerization of butadiene, temperatures of the order of about 60° C. give excellent yields of $V_4CH$.

A particular trait of the invention is that the reaction speed is increased by the addition to the catalytic system of a small, well-defined, amount of water of from 1-8 moles, preferably from 2-4 moles, of water per mole of catalytic complex. Outside these limits, the water, and, in general, all proton solvents exert an injurious action, blocking the catalytic activity of the system. This particular trait of the invention is advantageous because it allows the utilization of hydrated $M^2X_n$ compounds without being obliged to use anhydrous salts. Thus, in compounds $M^2X_n \cdot qH_2O$, $q$ can be 0-6. If anhydrous complexes are initially formed, water can be added to the reaction medium in the proportion indicated above.

Solvents which are of particular convenience for the dimerization of diolefins should, of course, be inert with respect to the catalyst. Typical solvents include saturated aliphatic and cycloaliphatic hydrocarbons such as hexane, cyclohexane and dichloroethane, aromatic or haloaromatic hydrocarbons such as benzene, toluene and chlorobenzene, as well as aliphatic, aromatic or cyclic ethers such as tetrahydrofuran. The last named solvent is interesting because it solubilizes the starting compounds while in most of the other noted solvents, the catalyst remains in suspension. $V_4CH$, and in general the dimerization products, can conveniently be used; its utilization presents the advantage of allowing the recovery of $V_4CH$ by a simple distillation without having the need to separate solvents.

The diolefins which can be dimerized with the described catalyst of this invention are very diversified. They can contain up to 10 or more carbon atoms and can be conjugated diolefins such as butadiene, isoprene, dimethylbutadiene and unconjugated diolefins such as norbornadiene. Codimerization can also be accomplished. The present catalytic system is especially appropriate for the dimerization of butadiene in vinyl cyclohexene with quantitative yield.

Another particular trait of the present invention is that the catalyst will selectively dimerize the diolefin in a diolefin-monoolefin mixture. The monoolefin is unchanged after the dimerization process and separation of the dimer and the olefin is very easy.

One particularly interesting application of the present catalyst is in the treatment of hydrocarbon fractions obtained from refineries which contain mixtures of diolefins and monoolefins. Thus, the butadiene in the $C_4$ fraction, which contains a mixture of butadiene and butenes, can be totally converted to $V_4CH$ w.. a selectivity of 100 percent. It is much easier to separate $V_4CH$ from non-dimerized butenes than to separate butadiene from butenes. It is apparent that this is an industrial operation of economic importance.

In the following Examples, a 125 ml stainless steel autoclave provided with a double lining for thermostatic control was used. In each case, the autoclave was cooled to −20° C. and placed under an inert atmosphere such as nitrogen or argon. The ferrate and $M^2X_n$ compound or one of the complexes $L_pM^2X_n$ was added and then the liquid diolefin was added. The $C_4$ fraction utilized in the Examples contained approximately 35-45% butadiene and 65-55% butenes. The autoclave was then heated to the dimerization temperature and maintained at that temperature, with agitation, for a given amount of time. Thereafter the catalyst was deactivated by adding hydrochloric acid with air bubbling through the reaction mixture. The reaction product thus obtained was distilled to separate out the solvent and the different products were examined and identified by vapor phase chromatography.

EXAMPLE 1-44

Dimerization of Butadiene With $[NaFe(CO)_3NO] + M^2X_n$

A suspension or solution of $1/n$ mmole of $M^2X_n$ in 5 ml toluene was added to a suspension of 193 mg (1 mmole) of sodium tricarbonyl nitrosyl ferrate in 5 ml toluene. The mixture was then agitated at 40° C. for 1 hour and a partial dissolution of the products in suspension and appearance of a brick-red color was noted. The resulting mixture was placed in the autoclave (precooled to −20° C.), and 16.2 g (300 mmoles) of liquid butadiene was added. The molar ratio between the butadiene and the initial sodium ferrate was 300. The autoclave was brought to 60° C. and maintained at that temperature for 5 hours. Thereafter the catalyst was deactivated with dilute hydrochloric acid and the reaction mixture distilled to obtain $V_4CH$.

The conversion and selectivity to $V_4CH$ is shown in the following Table I. It will be observed that the catalyst using zinc chloride and ferric chloride as $M^2X_n$ gave the best results.

TABLE I

| Example No. | $M^2X_n$ | Conversion % | Selectivity $V_4CH$ % |
|---|---|---|---|
| 1 | NaCl | 56 | 100 |
| 2 | $NaNO_2$ | 10.5 | 100 |
| 3 | $MgCl_2$ | 84 | 100 |
| 4 | $CaCl_2$ | 91.5 | 100 |
| 5 | $SrCl_2$ | 58 | 100 |
| 6 | $BaCl_2$ | 68.0 | 100 |
| 7 | $BCl_3$ | 82.0 | 100 |
| 8 | $AlCl_3$ | 95.0 | 100 |
| 9 | $AlBr_3$ | 34.0 | 100 |
| 10 | $GaCl_3$ | 97.5 | 97 |
| 11 | $InCl_3$ | 98.8 | 100 |
| 12 | $TlCl_3$ | 96.5 | 100 |
| 13 | $GeCl_4$ | 96.5 | 100 |
| 14 | $SnCl_2$ | 98 | 100 |
| 15 | $SnCl_4$ | 97.5 | 100 |
| 16 | CuCl | 99.5 | 100 |
| 17 | $CuCl_2$ | 80.5 | 100 |
| 18 | $AgNO_3$ | 91.0 | 100 |
| 19 | $AuCl_3$ | 98.5 | 100 |
| 20 | $ZnCl_2$ | 99.5 | 100 |
| 21 | $CdCl_2$ | 99 | 100 |
| 22 | $HgCl_2$ | 38 | 100 |
| 23 | $TiCl_4$ | 18 | 100 |
| 24 | $ZrCl_4$ | 81 | 99 |
| 25 | $HfCl_4$ | 97 | 100 |
| 26 | $ThCl_4$ | 95 | 99 |
| 27 | $VCl_3$ | 62 | 100 |
| 28 | $CrCl_3$ | 97.5 | 100 |
| 29 | $MoCl_5$ | 68 | 100 |
| 30 | $WCl_6$ | 97 | 100 |
| 31 | $MnCl_2$ | 80 | 99.7 |
| 32 | $ReCl_3$ | 98.5 | 100 |
| 33 | $FeCl_2$ | 37 | 100 |
| 34 | $FeCl_3$ | 98.5 | 100 |
| 35 | $RuCl_3$ | 100 | 100 |
| 36 | $OsCl_3$ | 99 | 100 |
| 37 | $CoCl_2$ | 35.5 | 100 |
| 38 | $CoCl_3$ | 98.5 | 100 |
| 39 | $RhCl_3$ | 96.5 | 100 |
| 40 | $IrCl_3$ | 97 | 100 |
| 41 | $NiCl_2$ | 41.5 | 100 |
| 42 | $PdCl_2$ | 81 | 100 |
| 43 | $PtCl_2$ | 90 | 100 |
| 44 | $PtCl_4$ | 81.5 | 100 |

EXAMPLES 45–51

The procedure of Examples 1–44 was repeated except that the $M^2X_n$ was replaced with $L_pM^2X_n$. The dimerization time was 5 hours except in Example 48 where a period of 16 hours was used. The results are shown in the following Table II and it will be noted that the zinc complex gave the best results while the tin and palladium complexes also gave convenient results.

TABLE II

| Ex. | $L_pM^2X_n$ | Conversion % | Selectivity $V_4CH$ % |
|---|---|---|---|
| 45 | dichlorozinc bipyridine | 100 | 100 |
| 46 | dichlorotin bipyridine | 98 | 100 |
| 47 | dichloronickel bipyridine | 76 | 100 |
| 48 | dichloropalladium bipyridine | 96.5 | 100 |
| 49 | dichloronickel bis pyridine | 94.5 | 95 |
| 50 | dichloronickel-bis(triphenylphosphine) | 20 | 100 |
| 51 | dichloronickel-bis[(diphenylphosphino) ethane] | 47 | 100 |

EXAMPLE 52

A suspension of 193 mg (1 mmole) of sodium tricarbonyl nitrosyl ferrate in 5 ml of toluene was placed in the autoclave and 16.2 g (300 mmole) of liquid butadiene was added at −20° C. The reaction mixture was brought to 60° C. and agitated for 5 hours. At the end of this period, the conversion of butadiene is 37% and after 22 hours it is 93%. In each case, the selectivity of $V_4CH$ is complete. This Example indicates the improvement achieved when the $M^2X_n$ or $L_pM^2X_n$ is employed.

EXAMPLES 53–54

Examples 1–44 were repeated to illustrate the influence of water. The results are shown in Table III below and it will be observed that for the same amount of time, the conversion of butadiene is greater with the hydrated material.

TABLE III

| Ex. No. | $M^2X_n.qH_2O$ | Conversion % | Selectivity $V_4CH$ % |
|---|---|---|---|
| 53 | $CoCl_2.6H_2O$ | 99.5 | 100 |
| 37 | $CoCl_2$ | 35.5 | 100 |
| 54 | $NiCl_2.6H_2O$ | 100 | 100 |
| 41 | $NiCl_2$ | 41.5 | 100 |

EXAMPLES 55–59

Inflfuence of Water on the Catalyst

These Examples show the influence of different quantities of water present in the catalyst [NaFe(CO)$_3$NO] + ZnCl$_2$. The procedure of Examples 1–44 was followed except that in Example 55, the sodium tricarbonyl nitrosyl ferrate was used in aqueous solution.

TABLE IV

| Example | mM $H_2O$/mM Complex | Conversion % | Selectivity $V_4CH$ % |
|---|---|---|---|
| 55 | pure $H_2O$ | 11 | 100 |
| 56 | 1 | 98 | 99.5 |
| 57 | 2 | 99 | 99.5 |
| 58 | 4 | 99.5 | 99.5 |
| 59 | 8 | 98 | 99.5 |

In Example 55, the catalyst converted only small quantities of the butadiene with concurrent total selectivity to $V_4CH$. This Example shows that too much water should be avoided. Quantities of water between 1 and 8, and preferably between 2 and 4, moles per mole of the complex gives the best results.

EXAMPLES 60–63

Influence of Iron Anion

These Examples show the influence on the conversion by the kind of iron anion in the valence states 2 and 3. All other conditions were the same as described in Examples 1–44.

TABLE V

| Example | $M^2X_n$ Iron Salt | Conversion % | Selectivity $V_4CH$ % |
|---|---|---|---|
| 33 | $FeCl_2$ | 37 | 100 |
| 60 | $FeBr_2$ | 99.5 | 100 |
| 61 | $FeI_2$ | 100 | 100 |
| 62 | Fe(acetylacetonate)$_2$ | 100 | 100 |
| 34 | $FeCl_3$ | 98.5 | 100 |
| 63 | Fe(acetylacetonate)$_3$ | 98.0 | 100 |

Iron acetylacetonate (Example 62) gives the best results with conversion and selectivity being 100%. Additionally, the catalyst system is soluble in the toluene. From a practical point of view, however, the use of ferric chloride appears particularly advantageous.

EXAMPLES 64–71

Influence of Solvent

These Examples show the influence of different solvents on the reactivity of the [NaFe(CO)$_3$NO] + ZnCl$_2$ catalyst system. The procedure of Examples 1–44 was repeated except for the solvent used. The results are shown in the following Table. It will be noted that the utility of tetrahydrofuran is very advantageous because it facilitates the solubilization of sodium tricarbonyl nitrosyl ferrate.

TABLE VI

| Example | Solvent | Conversion % | Selectivity V$_4$CH % |
|---|---|---|---|
| 64 | hexane | 99.0 | 99.5 |
| 65 | ether | 98.5 | 100 |
| 66 | tetrahydrofuran | 100 | 100 |
| 67 | acetone | 98.5 | 100 |
| 68 | chlorobenzene | 99.5 | 100 |
| 69 | dichloroethane | 98 | 100 |
| 70(id 20) | toluene | 99.5 | 100 |
| 71 | vinylcyclohexene | 83 | 100 |

EXAMPLE 72

Dimerization of Isoprene

The catalyst was prepared according to the procedure in Examples 1–44 using sodium tricarbonyl nitrosyl ferrate and zinc chloride. In place of the butadiene, 20.4 g (300 mmoles) of isoprene was used. After deactivation of the catalyst with dilute hydrochloric acid and distillation of the solvent, the dimers of isoprene are recovered. The conversion of isoprene was found to be 98% and selectivity to dimers was 100%.

EXAMPLE 73

Example 72 was repeated precisely except that the diolefin introduced into the autoclave was 300 mmoles of an equimolar mixture of butadiene and isoprene. The resulting conversion was 98% for butadiene and 98% for isoprene.

EXAMPLE 74

Dimerization of a C$_4$ Fraction

Example 72 was repeated except that the diolefin reactant used was 20 g of a steam cracked C$_4$ fraction containing 38% butadiene. At the termination of the reaction, 35% of the butadiene was found to have been converted to V$_4$CH.

EXAMPLE 75

Dimerization of Norbornadiene

The catalyst of Example 72 was placed in a Schlenk tube and then 15 g of bicyclo-[2,2,1]-heptadiene (norbornadiene) was added. The mixture was heated at 85° C. for 3 hours, the catalyst inactivated with dilute hydrochloric acid and the solvent distilled. 98% of the norbornadiene was converted to dimers.

Various changes and modifications can be made in the catalyst and process of the present invention without departing from the spirit and the scope thereof. The various embodiments set forth herein were for the purpose of further illustrating the invention but were not intended to limit it.

What is claimed is:

1. A process for the dimerization of diolefins of up to 10 carbon atoms in the liquid phase comprising contacting the diolefin in solution in an inert solvent at a temperature between 20°–120° C. with a dimerization catalytic amount of up to 10 mmole percent of a catalyst which is the reaction product of an alkali metal or alkaline earth metal salt of a tricarbonyl nitrosyl ferrate anion and a metal halogen or pseudo-halogen compound or complex, wherein said alkali metal or alkaline earth metal salt is of the formula $M^1[Fe(CO)_3(NO)]_m$ in which $m$ is 1 when $M^1$ is an alkali metal and $m$ is 2 when $M^1$ is an alkaline earth metal, and wherein said metal halogen or pseudo-halogen compound or complex thereof is of the formula $L_pM^2X_n$ in which $M^2$ is a metal of Groups IA, II, III, IV, V, VIB, VIIB or VIII of the Periodic Table, X is halogen, cyanide, sulfocyanide, isocyanate, nitrate, nitrite, sulfate, acetylacetonate, or carboxylate, L is a chalcogen or pnicogen ligand, p is an integer of 0–6 and $n$ is an integer of 1–6.

2. The process of claim 1 wherein said catalytic amount is about 0.33 mmole percent.

3. The process of claim 1 wherein said temperature is 40°–80° C.

4. The process of claim 1 wherein said alkali metal or alkaline earth metal salt is sodium tricarbonyl nitrosyl ferrate.

5. The process of claim 4 wherein said $L_pM^2X_n$ is selected from the group consisting of stannous chloride, stannic chloride, zinc chloride and ferric chloride.

6. The process of claim 4 wherein said $L_pM^2X_n$ is selected from the group consisting of dichlorozinc bipyridine and dichlorotin bipyridine.

7. The process of claim 1 wherein the ratio of $M^1[Fe(CO)_3(NO)]_m$ to $L_pM^2X_n$ is between 0.5 $n/m$ and 5 $n/m$.

8. The process of claim 1 wherein the ratio of $M^1[Fe(CO)_3(NO)]_m$ to $L_pM^2X_n$ is equal to $n/m$ and the dimerization process temperature is between 40°–90° C.

9. The process of claim 1 wherein the reaction medium contains between 1 and 8 moles of water per mole of catalyst.

10. The process of claim 9 wherein the reaction medium contains between 2 and 4 moles of water per mole of catalytic complex.

11. The process of claim 1 wherein the inert solvent is selected from the group consisting of toluene, hexane, tetrahydrofuran and vinylcyclohexene.

12. The process of claim 1 wherein the diolefin is selected from the group consisting of butadiene, isoprene, norbornadiene and mixtures thereof.

13. The process of claim 1 wherein said diolefin is a refinery C$_4$ fraction containing butadiene and butenes.

* * * * *